United States Patent
Jacquemet et al.

(10) Patent No.: US 8,163,829 B2
(45) Date of Patent: Apr. 24, 2012

(54) USE OF PHOSPHORIC ACID TO REDUCE THE QUANTITY OF FREE DISPERSING AGENT IN A METHOD FOR CONCENTRATING CALCIUM CARBONATE IN WATER

(75) Inventors: Christian Jacquemet, Lyons (FR); Jacques Mongoin, Quincieux (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 12/740,964

(22) PCT Filed: Jul. 28, 2008

(86) PCT No.: PCT/IB2008/002040
§ 371 (c)(1),
(2), (4) Date: Jul. 23, 2010

(87) PCT Pub. No.: WO2009/040616
PCT Pub. Date: Apr. 2, 2009

(65) Prior Publication Data
US 2010/0298480 A1    Nov. 25, 2010

(30) Foreign Application Priority Data
Sep. 28, 2007    (FR) ..................... 07 06806

(51) Int. Cl.
*C08K 3/26*    (2006.01)
(52) U.S. Cl. ...................... 524/427; 524/414
(58) Field of Classification Search ............ 524/414, 524/427
See application file for complete search history.

(56) References Cited

U.S. PATENT DOCUMENTS

| | | | |
|---|---|---|---|
| 5,145,902 A | 9/1992 | Ravet et al. | |
| 5,711,799 A * | 1/1998 | Snowden et al. | 106/465 |
| 6,315,867 B1 | 11/2001 | Skuse et al. | |
| 2004/0077762 A1 | 4/2004 | Mongoin et al. | |
| 2005/0020743 A1 | 1/2005 | Ruhlmann et al. | |
| 2005/0234176 A1 | 10/2005 | Mongoin et al. | |
| 2008/0146715 A1 | 6/2008 | Yuan et al. | |

FOREIGN PATENT DOCUMENTS

| | | |
|---|---|---|
| EP | 0 412 027 | 2/1991 |
| EP | 0 839 956 | 5/1998 |
| FR | 2 829 708 | 3/2003 |
| FR | 2 895 686 | 7/2007 |
| WO | 02 49765 | 6/2002 |
| WO | 03 016217 | 2/2003 |
| WO | 2006 081501 | 8/2006 |

* cited by examiner

*Primary Examiner* — Peter Szekely
(74) *Attorney, Agent, or Firm* — Oblon, Spivak, McClelland, Maier & Neustadt, L.L.P.

(57) ABSTRACT

The invention consists of the use of phosphoric acid, in a method for concentrating an aqueous dispersion or suspension of calcium carbonate in the presence of at least one acrylic dispersing agent, as an agent for reducing the quantity of free dispersing agent, i.e. the fraction of acrylic dispersing agent not adsorbed onto the surface of the particles of the calcium carbonate and present in the aqueous phase. It also pertains to the aqueous dispersions or suspensions of calcium carbonate, exhibiting a reduced quantity of free dispersing agent.

20 Claims, No Drawings

USE OF PHOSPHORIC ACID TO REDUCE THE QUANTITY OF FREE DISPERSING AGENT IN A METHOD FOR CONCENTRATING CALCIUM CARBONATE IN WATER

This application is a 371 of PCT/IB08/02040, filed Jul. 28, 2008.

Calcium carbonate is preferentially transported in the form of an aqueous suspension or dispersion, which has proven to be easier to handle, and particularly to pump, than a powder. One of the goals of the person skilled in the art is to deliver the greatest possible quantity of mineral material (though without increasing the viscosity of the medium too much), meaning increasing the solids content of the aqueous suspension or dispersion: this solids content corresponds to the dry weight of mineral material compared to the total weight of said dispersion or suspension. This solids content is increased by way of a phase of concentration, corresponding to an evaporation of water by mechanical and/or thermal means.

For calcium carbonate, this step of concentration makes it possible to go from a starting solids content no greater than 50%, to a final solids content equal to or greater than 60%, and in some cases greater than 70%, or even 72%. It is then necessary to add a dispersing agent, whose function is to stabilize the particles of calcium carbonate, at a high concentration, within the water, though without increasing the viscosity of the medium too much. Such dispersing agents have been known for many years, and mostly consist of homopolymers and copolymers of acrylic acid.

When the acrylic dispersing agent is added during the aforementioned step of concentration, it acts by adsorbing onto the surface of the calcium carbonate to some degree, and leads to a stabilization of the mineral particles by electrostatic mechanisms. Given the composition of this acrylic dispersing agent, this adsorption is generally not total, so much so that a certain quantity of unabsorbed acrylic dispersing agent remains in the aqueous phase: it will be designated using the expression "free dispersing agent". Thus, when manufacturing coatings for paper (which constitutes one of the major applications of calcium carbonate), this fraction of free dispersing agent is the cause of the major problem: degradation in the printability of the coated paper.

This is because the concentrated aqueous dispersions and suspensions of calcium carbonate are directly involved in the manufacturing of the coatings which are later used to coat the sheet of paper by being applied onto it. At this point, in the aqueous phase of said coating sauce, the fraction of free dispersing agent not adsorbed onto the surface of the calcium carbonate is present. After being applied onto the sheet of paper, the coating sauce undergoes a step of drying: the free dispersing agent, which is hydrophilic, driven by water, migrates from the inside of the coat onto the surface of the coated paper. This phenomenon is the cause of a partial change in the energy of the coated paper's surface: the printability of the coated paper then degrades. In order to limit this effect, the person skilled in the art seeks to minimize the quantity of free dispersing agent contained within the aqueous dispersions and suspensions of calcium carbonate.

Seeking to resolve this problem, while enabling the concentration of aqueous dispersions and suspensions of calcium carbonate in the presence of an acrylic dispersing agent, from a concentration less than or equal to or 50% to a concentration equal to or greater than 60%, while imparting to them a satisfactory viscosity, the Applicant has developed the use of a solution of phosphoric acid in such a method. It is thereby demonstrated that while obtaining a solids content and viscosity equal to or greater than those obtained for the same dispersion or suspension not containing phosphoric acid, the result is a very significant reduction in the fraction of free acrylic dispersing agent in the aqueous phase. This contributes to improving the printability of the paper.

Such a use of phosphoric acid is, to the best of our knowledge, entirely novel and particularly inventive, as this compound was theretofore used routinely by the person skilled in the art in aqueous suspensions of mineral materials, solely with the function of a buffering agent: nothing drew the attention of the person skilled in the art to this compound as having the potential to reduce the quantity of free dispersing agent contained within the concentrated aqueous dispersions and suspensions of calcium carbonate. To that end, there is a wide range of the art dedicated to manufacturing so-called "acid-resistant" calcium carbonate particles, said methods consisting of adding a chelating agent, as well as a weak acid which is generally phosphoric acid, into the aqueous medium containing the mineral material.

This method is described in several patents (U.S. Pat. No. 5,043,017, U.S. Pat. No. 5,156,719, WO 98/29601, WO 97/41302) and in the publication "Neutral groundwood papers: practical and chemical aspects" (International Paper and Coatings Chemistry Symposium, 5th, Montreal, QC, Canada, 16-19 Jun. 2003, Publisher: Pulp and Paper Technical Association of Canada, Montreal, Quebec), which discloses that the function of the phosphoric acid is to stabilize the pH.

Additionally, from a chemical viewpoint, phosphoric acid ($H_3PO_4$) should not be confused with condensed phosphated compounds, which include cyclophosphates, polyphosphates and branched inorganic phosphates or superphosphates, according to the document "The Chemical Structure and Properties of Condensed Inorganic Phosphates" (The Biochemistry of Inorganic Polyphosphates, I. S. Kulaev, V. M. Vagabov, T. V. Kulakovskaya, 2004 John Wiley & Sons, Ltd ISBN 0-470-85810-9). These compounds are molecules which result from the condensation of multiple phosphate molecules among one another, the best-known being tripolyphosphate (TPP), pyrophosphate, and hexametaphosphate (HMP).

Besides this chemical difference, the state of the technique regarding the various processes for manufacturing calcium carbonate in an aqueous medium makes a very clear distinction between phosphoric acid and the condensed phosphate compounds. Up until now and as indicated in the document cited above, the former had been primarily known as a pH-stabilizing agent for aqueous dispersions and suspensions containing calcium carbonate, and the latter as dispersing agents for this mineral material in water in combination with acrylic dispersing agents, as described in the following documents.

For several years, various combinations between an acrylic dispersing agent and another dispersing agent based on condensed phosphates or their salts have been used to disperse a calcium carbonate in water. This is true of sodium pyrophosphate in association with a homopolymer of (meth)acrylic acid (U.S. Pat. No. 3,661,610), sodium hexametaphosphate with a homopolymer of (meth)acrylic acid (JP 62-279834), and sodium pyrophosphate and sodium polyphosphate with a sodium polyacrylate (CN 1 884 085). In each of these documents, the water-soluble condensed phosphate compound is presented as a dispersing agent, which, in combination with the acrylic polymer, contributes to stabilizing the calcium carbonate within the water, though without altering the viscosity of the medium too much.

It was then obviously realized that these condensed phosphate compounds, when used with an acrylic dispersing agent, made it possible to reduce the quantity of acrylic polymer used: adding the second (phosphate) dispersing agent quite simply serves to remedy the fact that the quantity of the first (acrylic) dispersing agent was reduced. This is particularly the object of document EP 0 839 956 (combination of an acrylic/acrylamide copolymer with a water-soluble condensed phosphate compound that is sodium hexametaphosphate) and the document WO 2006/081501 (combination of an anionic dispersing agent and a condensed phosphate dispersing agent such as tripolyphosphate, hexametaphosphate, or sodium tripolyphosphate, or tetrasodium pyrophosphate).

Regarding these last two documents, it is important to specify several things. First, that the phosphoric acid is not covered by the object of these patents; rather, the authors of the document WO 2006/081501 indicate that the phosphoric acid may be used as an agent for controlling the pH ([020]). This is the function that has been known for several years for this compound, and which the authors of this document therefore distinguish from the condensed phosphate dispersing agents covered by their claims. Additionally, to strengthen her demonstration, the Applicant has chosen to test the solution proposed in these 2 documents, i.e. the combination of an acrylic dispersing agent with a water-soluble condensed phosphate compound which is sodium hexametaphosphate (cited as one of the preferred compounds in these 2 documents). The tests demonstrate that the quantity of free dispersing agent is then greater in the presence of the water-soluble condensed phosphate compound. This confirms that the solutions presented in these documents cannot resolve the technical problem of reducing the free dispersing agent level.

Without wishing to be bound by any theory, the Applicant thinks that phosphoric acid, when it comes into contact with the calcium carbonate by being introduced into the aqueous dispersion or suspension, develops a high reactivity with respect to the mineral particles. These leads to a modification of the surface of the calcium carbonate through reaction with the phosphoric acid, and the creation of high-energy sites: thus the surface of the transformed mineral is prepared for a better adsorption of the homopolymer and/or copolymer of (meth)acrylic acid. The quantity of unabsorbed acrylic dispersing agent (and which is therefore present in its free form in the aqueous phase) is thereby reduced.

To our knowledge, there is only one document that can resolve the same technical problem as that covered by the present Application and which, to that end, should be taken as the closest state of the art in an analysis of the patentability of the problem-solution type. This is document EP 1 347 835, which relies on the implementation of homo- and copolymers of partially acidic (meth)acrylic acid, and whose neutralization rates are optimized by a monofunctional agent and a bifunctional agent. Without denying this solution its inventiveness, it nonetheless remains limited in the choice of particular homo- and copolymers of (meth)acrylic acid owing to their neutralization; however, the present invention applies to any one of these acrylic polymers, independent of its neutralization.

Thus, the first object of this invention resides in the use of phosphoric acid, in a method for concentrating an aqueous dispersion or suspension of calcium carbonate in the presence of at least one acrylic dispersing agent, as an agent making it possible to reduce the quantity of free dispersing agent.

This use is further characterized in that 0.05% to 1%, and preferentially 0.1% to 0.6% by dry weight of phosphoric acid is used, in relation to the dry weight of calcium carbonate.

This use is further characterized in that 0.05% to 1%, and preferentially 0.1% to 0.6% by dry weight of acrylic dispersing agent is used, in relation to the dry weight of calcium carbonate.

This use is further characterized in that the acrylic dispersing agent and phosphoric acid are added into the aqueous dispersion or suspension of calcium carbonate, before and/or during the step of concentration.

For example, the phosphoric acid may be added during a step of grinding the calcium carbonate in an aqueous medium, this step taking place before the aforementioned step of concentration.

This use is further characterized in that the phosphoric acid is added into the aqueous dispersion or suspension of calcium carbonate before and/or at the same time as the acrylic dispersing agent.

This use is further characterized in that the acrylic dispersing agent consists of at least one homopolymer of (meth)acrylic acid and/or at least one copolymer of (meth)acrylic acid with another monomer.

This use is further characterized in that the calcium carbonate is chosen from among a natural or synthetic calcium carbonate and mixtures thereof, preferentially in that it is a natural calcium carbonate, very preferentially in that it is a natural calcium carbonate chosen from among marble, chalk, limestone, calcite, and mixtures thereof.

This use is further characterized in that the calcium carbonate content by dry weight in the aqueous dispersion or suspension is no greater than 50% of its total weight, and in that its final content by dry weight of calcium carbonate after concentration is no less than 60%, preferentially 70%, and very preferentially 72% of its total weight.

In a first variant, this use is characterized in that it takes place within a method of concentrating an aqueous suspension of calcium carbonate, previously obtained by grinding without a grinding agent, and having an initial content of calcium carbonate by dry weight no greater than 30% of its total weight.

In a second variant, this use is characterized in that it takes place within a method of concentrating an aqueous suspension of calcium carbonate, previously obtained by grinding in the presence of a grinding agent, and having an initial content of calcium carbonate by dry weight no greater than 50% of its total weight, and no less than 30% of its total weight.

This use is further characterized in that the concentration of the aqueous dispersion or suspension of calcium carbonate is carried out by mechanical and/or thermal means. However, the person skilled in the art my use any other technique of his or her choice, in order to partially eliminate the water, and therefore to increase the concentration of calcium carbonate in the medium.

The second object of the invention consists of an aqueous dispersion or suspension of calcium carbonate, containing at least an acrylic dispersing agent, an agent for reducing the quantity of free dispersing agent consisting of phosphoric acid, and characterized in that it has a level of free dispersing agent, as measured by the TOC method, less than 40%, preferentially 30%, and very preferentially 12%.

A very detailed description of said TOC method is found in the introduction to the tests.

This aqueous dispersion or suspension of calcium carbonate is further characterized in that it contains 0.05% to 1%, and preferentially 0.1% to 0.6% by dry weight of phosphoric acid, compared to the dry weight of calcium carbonate.

This aqueous dispersion or suspension of calcium carbonate is further characterized in that it contains 0.05% to 1%, and preferentially 0.1% to 0.6% by dry weight of the acrylic dispersing agent, compared to the dry weight of calcium carbonate.

This aqueous dispersion or suspension of calcium carbonate is further characterized in that the acrylic dispersing agent consists of at least one homopolymer of (meth)acrylic acid and/or at least one copolymer of (meth)acrylic acid with another monomer.

This aqueous dispersion or suspension of calcium carbonate is further characterized in that the calcium carbonate is chosen from among a natural or synthetic calcium carbonate and mixtures thereof, preferentially in that it is a natural calcium carbonate, very preferentially in that it is a natural calcium carbonate chosen from among marble, chalk, limestone, calcite, and mixtures thereof.

This aqueous dispersion or suspension of calcium carbonate is further characterized in that its content of calcium carbonate by dry weight is equal to or greater than 60%, preferentially 70%, and very preferentially 72% of its total weight.

EXAMPLES

In all the tests, the quantity of acrylic dispersing agent contained within the aqueous phase of the dispersions and suspensions of calcium carbonate, also known as the quantity of free dispersing agent, is measured by the method described below, known in this application as the "TOC method".

We start by determining the value TOC 1. This value is actually measured on an aqueous solution of acrylic polymer that contains no calcium carbonate. The concentrations of acrylic polymers are identical to those chosen for the experiments of concentrating the aqueous dispersion or suspension of calcium carbonate.

The quantity of acrylic polymer found in the aqueous dispersion or suspension of calcium carbonate after being concentrated is measured after filtering said dispersion or suspension of calcium carbonate, with the help of the same TOC-meter. The result is the value TOC 2.

The quantity of free dispersing agent contained within the aqueous phase of the dispersion or suspension of calcium carbonate after being concentrated is thereby given by the relationship:

$$\% \text{ of free dispersing agent} = \frac{TOC2}{TOC1} \times 100$$

Practically speaking, the tested aqueous dispersion or suspension of calcium carbonate is first filtered through an "API Fluid Loss Measurement" filter-press from the company BAROID™, equipped with a paper filter 90 mm in diameter (Whatman #50) and a metal sieve.

The filtration is performed at a pressure of 100 psi (7 bars). The resulting filtrate is then filtered again through a Millipore™ filter whose porosity is 0.45 μm.

The waters thereby obtained are analyzed using a TOC-VCSH thermal TOC-meter sold by the company SHIMADZU™ and calibrated with a solution of potassium hydrogenophthalate Example 1

This example illustrates the inventive use of phosphoric acid as an agent reducing the quantity of free dispersing agent when an aqueous suspension of a natural calcium carbonate, which is a Norwegian marble, is concentrated.

This example particularly illustrates the use of an acrylic dispersing agent D1 which is:
a homopolymer of acrylic acid,
in which 70% by molar weight of the carboxylic sites are neutralized by sodium hydroxide and 30% by molar weight of the carboxylic sites are neutralized by lime,
and whose mean molecular weight by mass is equal to 5500 g/mol (as determined in the method described in the document WO 2007/069037).

This example also illustrates the variant of the invention well known to the person skilled in the art, in which the initial suspension of calcium carbonate is derived from a step of grinding, with no dispersing agent. Its initial content of calcium carbonate by dry weight is equal to 15% of its total weight, and it contains 73% and 96% by weight of particles whose diameter is less than 1 μm and 2 μm respectively, as measured with a Sedigraph™ 5100 sold by the company MICROMERITICS™.

Throughout this application, the person skilled in the art may refer to the document EP 1 294 476, which specifies the standard conditions of such grinding.

For each of the tests 1 to 3, the aqueous suspension of calcium carbonate is concentrated using a hot plate with a power of 0.5 KWatt.

Test #1

This test illustrates the prior art, and uses 0.5% by dry weight of dispersing agent D1, added to the suspension before the step of concentration.

Test #2

This test illustrates the prior art, and uses 0.5% by dry weight of dispersing agent D1, and 0.5% by dry weight of a water-soluble condensed phosphate dispersing agent, which is sodium hexametaphosphate (a compound preferred in documents EP 0 839 956 and WO 2006/081501), the sodium hexametaphosphate being introduced first, and the dispersing agent D1 second, both before the step of concentration.

Test #3

This test illustrates the invention, and uses 0.5% by dry weight of dispersing agent D1, and 0.5% by dry weight of phosphoric acid, the phosphoric acid being introduced first, and the dispersing agent D1 second, both before the step of concentration.

For each of the tests, the final dry solids content of each suspension is determined, as are the Brookfield™ viscosities at 10 and 100 revolutions per minute (μ10 and μ100 for short), and the percentage of free dispersing agent (see table 1).

TABLE 1

| | Test no. | | |
|---|---|---|---|
| | 1 | 2 | 3 |
| Prior Art (PA)/Invention (IN) | PA | PA | IN |
| Solids content (%) | 62.0 | 67.3 | 67.5 |
| μ10 (mPa · s) | 15,240 | 1040 | 140 |
| μ100 (mPa · s) | 2,520 | 330 | 140 |
| Free dispersing agent (%) | 60.1 | 78.6 | 32.5 |

According to test #1, the solids content of the aqueous suspension of calcium carbonate could not be raised above 62%. Additionally, note that the Brookfield™ viscosities at 10 and 100 revolutions per minute are very high, which makes the corresponding suspension relatively viscous, and difficult to handle.

According to test #2, the solids content of the aqueous suspension of calcium carbonate was successfully raised to a value above 67%, while obtaining very low (and therefore acceptable) viscosity values. On the other hand, the quantity of free dispersing agent in the aqueous phase was heavily increased: such a suspension will degrade the printability of the paper, coated using a paper coating produced with this aqueous suspension of calcium carbonate.

According to test #3, the best values were achieved both in terms of solids content (the highest value) and in terms of viscosities (the lowest values). Additionally, the quantity of free dispersing agent was heavily decreased compared to the tests illustrating the prior art: in this situation, we contribute to not degrading the printability of the coated paper in the final application.

Example 2

This example illustrates the inventive use of phosphoric acid as an agent reducing the quantity of free acrylic dispersing agent when an aqueous suspension of a natural calcium carbonate, which is a Norwegian marble, is concentrated.

This example particularly illustrates the use of an acrylic dispersing agent D2 which is:
a homopolymer of acrylic acid,
fully neutralized by sodium hydroxide,
and whose molecular weight by mass is equal to 11,000 g/mol (as determined according to the method described in the document WO 2007/069037).

This example also illustrates the variant of the invention well known to the person skilled in the art, in which the initial suspension of calcium carbonate is derived from a step of grinding, with no dispersing agent. Its initial content of calcium carbonate by dry weight is equal to 25% of its total weight, and it contains 62% and 92.5% by weight of particles whose diameter is less than 1 µm and 2 µm respectively, as measured with a Sedigraph™ 5100 sold by the company MICROMERITICS™.

For each of the tests 4 to 6, the aqueous suspension of calcium carbonate is concentrated using a hot plate with a power of 0.5 KWatt.

Test #4

This test illustrates the prior art, and uses 0.30% by dry weight of dispersing agent D2, added to the suspension before the step of concentration.

Test #5

This test illustrates the prior art, and uses 0.30% by dry weight of dispersing agent D2, and 0.1% by dry weight of a water-soluble condensed phosphate dispersing agent which is sodium hexametaphosphate (the preferred compound in the documents EP 0 839 956 et WO 2006/081501), these two products being added at the same time into the suspension, both before the step of concentration.

Test #6

This test illustrates the prior art, and uses 0.30% by dry weight of dispersing agent D2, and 0.1% by dry weight of phosphoric acid, these two products being added at the same time into the suspension, both before the step of concentration.

For each of the tests, the final dry solids content of each suspension is determined, as are the Brookfield™ viscosities at 10 and 100 revolutions per minute (µ10 and µ100 for short), and the percentage of free dispersing agent (see table 2).

TABLE 2

| | Test no. | | |
|---|---|---|---|
| | 4 | 5 | 6 |
| Prior Art (PA)/Invention (IN) | PA | PA | IN |
| Solids content (%) | 65.5 | 67.0 | 67.5 |
| µ10 (mPa · s) | 17,800 | 15,700 | 9,200 |
| µ100 (mPa · s) | 2,680 | 2,350 | 1,400 |
| Free dispersing agent (%) | 41.0 | 45.7 | 35.1 |

As in example 1, it is observed that the best results are obtained when phosphoric acid is used. According to test #6, the result is indeed the highest solids content, the lowest viscosities, while minimizing the level of free dispersing agent. It is also demonstrated that the sodium hexametaphosphate leads to an increase in this rate, and therefore cannot work for the present invention.

Example 3

This example illustrates the inventive use of phosphoric acid as an agent reducing the quantity of free dispersing agent when an aqueous suspension of a natural calcium carbonate, which is a Norwegian marble, is concentrated.

This example particularly illustrates the use of an acrylic dispersing agent D3 which is:
a copolymer of acrylic acid and maleic anhydride (in a mass ratio of 70/30),
fully neutralized by sodium hydroxide,
and whose molecular weight by mass is equal to 15,600 g/mol (as determined according to the method described in the document WO 2007/069037).

This example also illustrates the variant of the invention well known to the person skilled in the art, in which the initial suspension of calcium carbonate is derived from a step of grinding, with no dispersing agent. Its initial content of calcium carbonate by dry weight is equal to 15% of its total weight, and it contains 73% and 96% by weight of particles whose diameter is less than 1 µm and 2 µm respectively, as measured with a Sedigraph™ 5100 sold by the company MICROMERITICS™.

For each of the tests #7 and 8, the aqueous suspension of calcium carbonate is concentrated using an EPCON™ evaporator.

Test #7

This test illustrates the prior art, and uses 0.6% by dry weight of dispersing agent D3, added to the suspension before the step of concentration.

Test #8

This test illustrates the prior art, and uses 0.6% by dry weight of dispersing agent D3, and 0.26% by dry weight of phosphoric acid, these two products being added at the same time into the suspension, both before the step of concentration.

For each of the tests, the final dry solids content of each suspension is determined, as are the Brookfield™ viscosities at 10 and 100 revolutions per minute (µ10 and µ100 for short), and the percentage of free dispersing agent (see table 3).

TABLE 3

| | Test no. | |
|---|---|---|
| | 7 | 8 |
| Prior Art (PA)/Invention (IN) | PA | IN |
| Solids content (%) | 65.6 | 72.1 |
| µ10 (mPa · s) | 910 | 180 |
| µ100 (mPa · s) | 540 | 180 |
| Free dispersing agent (%) | 35.8 | 17.5 |

It is observed that the use of phosphoric acid according to test #8 has made it possible to increase the solids content and reduce the viscosities of the suspension, while drastically bringing down the level of free acrylic dispersing agent in the aqueous phase.

Example 5

This example illustrates the inventive use of phosphoric acid as an agent reducing the quantity of free dispersing agent when an aqueous suspension of a natural calcium carbonate, which is an Italian marble, is concentrated.

This example illustrates, during a later step of concentration D4, the use of acrylic dispersing agent D4 which is:
a homopolymer of acrylic acid,
in which 45% by molar weight of the carboxylic sites are neutralized by the sodium hydroxide, the remainder staying in a non-neutralized form.
and whose molecular weight by mass is equal to 10,000 g/mol (as determined according to the method described in the document WO 2007/069037).

This example also illustrates the variant of the invention well known to the person skilled in the art, in which the initial suspension of calcium carbonate is derived from a step of grinding, in the presence of a dispersing agent. The initial aqueous suspension of calcium carbonate actually results from a first step of grinding in the presence of 0.35% by dry weight of a grinding aid agent (in relation to the dry weight of calcium carbonate), which is a homopolymer of acrylic acid, whose molecular weight is equal to 9,000 g/mole, and whose percentages by molar weight of the neutralized sites are equal to 50% by sodium hydroxide, 15% by lime, 15% by magnesium hydroxide (thus 20% by molar weight are non-neutralized carboxylic sites). Said suspension then exhibits a content of calcium carbonate by dry weight equal to 35% of its total weight, and a particle grain size such that 85.5% by weight of the particles have a mean diameter less than 1 µm (measured using a Sedigraph™ 5100 sold by the company MICROMERITICS™).

For each of the tests 9 to 10, the aqueous suspension of calcium carbonate is concentrated using a hot plate with a power of 0.5 KWatt.

Test #9

This test illustrates the prior art, and uses 0.42% by dry weight of dispersing agent D4, and 0.18% by dry weight of a water-soluble condensed phosphate dispersing agent which is sodium hexametaphosphate (the preferred compound in documents EP 0 839 956 and WO 2006/081501), the sodium hexametaphosphate and D1 being added in that order, during the step of concentration.

Test #10

This test illustrates the invention, and uses 0.42% by weight of dispersing agent D4, and 0.18% by dry weight of phosphoric acid, the phosphoric acid and D4 being added in that order, during the step of concentration.

For each of the tests, the final dry solids content of each suspension is determined, as are the Brookfield™ viscosities at 10 and 100 revolutions per minute (µ10 and µ100 for short), and the percentage of free dispersing agent (see table 4).

TABLE 4

| | Test no. | |
|---|---|---|
| | 9 | 10 |
| Prior Art (PA)/Invention (IN) | PA | IN |
| Solids content (%) | 70.7 | 70.9 |
| µ10 (mPa · s) | 9,180 | 1,540 |
| µ100 (mPa · s) | 1,640 | 450 |
| Free dispersing agent (%) | 36.0 | 10.6 |

The best results are obtained for test #10, which leads to the highest dry solids content associated with the lowest viscosities, all while making it possible to heavily reduce the quantity of free dispersing agent.

The invention claimed is:

1. A method comprising concentrating an aqueous suspension of calcium carbonate in the presence of at least one acrylic dispersing agent, said method further comprising adding phosphoric acid as an agent, to said suspension in an amount sufficient to reduce a quantity of free dispersing agent in said suspension,
    wherein said aqueous suspension of calcium carbonate is previously obtained by grinding without a grinding agent and has an initial content of calcium carbonate by dry weight no greater than 30% of its total weight.

2. The method according to claim 1, comprising adding 0.05% to 1% by dry weight of phosphoric acid, in relation to the dry weight of calcium carbonate.

3. The method according to claim 1, wherein 0.05% to 1% by dry weight of acrylic dispersing agent in relation to the dry weight of calcium carbonate is present in said suspension.

4. The method according to claim 1, wherein the acrylic dispersing agent and phosphoric acid are added into the aqueous suspension of calcium carbonate before and/or during the concentrating.

5. The method according to claim 1, wherein the phosphoric acid is added into the aqueous suspension of calcium carbonate before and/or at the same time as the acrylic dispersing agent.

6. The method according to claim 1, wherein the acrylic dispersing agent comprises at least one homopolymer of (meth)acrylic acid and/or at least one copolymer of (meth)acrylic acid with another monomer.

7. The method according to claim 1, wherein the calcium carbonate is selected from the group consisting of natural or synthetic calcium carbonate and mixtures thereof.

8. The method according to claim 1, wherein the aqueous suspension's initial content of calcium carbonate by dry weight is no greater than 50% of its total weight, and wherein its final content of calcium carbonate by dry weight is equal to or greater than 60% of its total weight.

9. The method according to claim 1, wherein the concentrating of the aqueous suspension of calcium carbonate is carried out by mechanical and/or thermal means.

10. The method of claim 1, wherein the calcium carbonate is selected from the group consisting of marble, chalk, limestone, calcite, and mixtures thereof.

11. A method comprising concentrating an aqueous suspension of calcium carbonate in the presence of at least one acrylic dispersing agent, said method further comprising adding phosphoric acid as an agent to said suspension in an amount sufficient to reduce a quantity of free dispersing agent in said suspension, wherein said aqueous suspension of calcium carbonate is previously obtained by grinding in the presence of a grinding agent and has an initial content of calcium carbonate no greater than 50% of its total weight and no less than 30% of its total weight.

12. The method according to claim 11, comprising adding 0.05% to 1% by dry weight of phosphoric acid, in relation to the dry weight of calcium carbonate.

13. The method according to claim 11, wherein 0.05% to 1% by dry weight of acrylic dispersing agent in relation to the dry weight of calcium carbonate is present in said suspension.

14. The method according to claim 11, wherein the acrylic dispersing agent and phosphoric acid are added into the aqueous suspension of calcium carbonate before and/or during the concentrating.

15. The method according to claim 11, wherein the phosphoric acid is added into the aqueous suspension of calcium carbonate before and/or at the same time as the acrylic dispersing agent.

16. The method according to claim 11, wherein the acrylic dispersing agent comprises at least one homopolymer of (meth)acrylic acid and/or at least one copolymer of (meth)acrylic acid with another monomer.

17. The method according to claim 11, wherein the calcium carbonate is selected from the group consisting of natural or synthetic calcium carbonate and mixtures thereof.

18. The method according to claim 11, wherein the aqueous dispersion or suspension's initial content of calcium carbonate by dry weight is no greater than 50% of its total weight, and wherein its final content of calcium carbonate by dry weight is equal to or greater than 60% of its total weight.

19. The method according to claim 11, wherein the concentrating of the aqueous suspension of calcium carbonate is carried out by mechanical and/or thermal means.

20. The method of claim 11, wherein the calcium carbonate is selected from the group consisting of marble, chalk, limestone, calcite, and mixtures thereof.

* * * * *